US006661911B1

(12) United States Patent
Ishikura et al.

(10) Patent No.: US 6,661,911 B1
(45) Date of Patent: Dec. 9, 2003

(54) AUTOMATIC INSPECTING APPARATUS BY IMAGE PROCESSING

(75) Inventors: Tohru Ishikura, Yokohama (JP); Hiroyuki Fukuchi, Yokohama (JP); Yasuo Miwa, Yokohama (JP); Takanori Hatsuki, Yokohama (JP)

(73) Assignee: Kirin Techno-System Corporation, Yokohama (JP)

( * ) Notice: Subject to any disclaimer, the term of this patent is extended or adjusted under 35 U.S.C. 154(b) by 588 days.

(21) Appl. No.: 09/584,713

(22) Filed: Jun. 1, 2000

(30) Foreign Application Priority Data

Jun. 2, 1999 (JP) .......................................... 11-154703

(51) Int. Cl.[7] ................................................ G06K 9/00

(52) U.S. Cl. ....................... 382/142; 382/141; 382/143; 198/339.1

(58) Field of Search ................................ 382/141, 142, 382/143; 198/339.1, 340, 341.01

(56) References Cited

U.S. PATENT DOCUMENTS 5,440,648 A * 8/1995 Roberts et al. ............. 382/141
5,680,473 A * 10/1997 Kanzaka et al. ............ 382/141
5,734,742 A * 3/1998 Asaeda et al. .............. 382/141
5,926,556 A * 7/1999 Douglas et al. ............. 382/142
5,978,499 A * 11/1999 Tossel et al. ............... 382/141

FOREIGN PATENT DOCUMENTS

JP 61-041905 2/1986

* cited by examiner

*Primary Examiner*—Jingge Wu
*Assistant Examiner*—Ryan J. Hesseltine
(74) *Attorney, Agent, or Firm*—Oblon, Spivak, McClelland, Maier & Neustadt, P.C.

(57) ABSTRACT

An automatic inspecting apparatus has a function for generating a discharge signal for discharging a defective object at a predetermined position. The automatic inspecting apparatus comprises an imaging device for imaging a moving object, a sensor for detecting the arrival of the object, an image processing unit for processing images produced by the imaging device to detect defective objects, and a discharge signal generating unit for discharging defective objects at a predetermined position. An ID number is assigned to each image produced by the imaging device, and pulses generated by an encoder start to be counted when each ID number is assigned. If the object is determined to be defective after image processing by the image processing unit, the discharge signal generating unit generates a discharge signal when the number of pulses counted for the corresponding ID number reaches a pulse number equivalent to the distance between the sensor position and the discharge position.

3 Claims, 2 Drawing Sheets

AUTOMATIC INSPECTING APPARATUS BY IMAGE PROCESSING

BACKGROUND OF THE INVENTION

1. Field of the Invention

The present invention relates to an apparatus for automatically inspecting an object such as a bottle which is transported by a conveyor or the like by utilizing image processing, and more particularly to an automatic inspecting apparatus having a function for generating a discharge signal for discharging a defective object at a predetermined position.

2. Description of the Prior Art

There has been an automatic inspecting apparatus for inspecting objects such as containers which are transported by a conveyor or other transporting equipment. This type of automatic inspecting apparatus comprises a video camera for imaging the moving object, a sensor for detecting the arrival of the object and outputting a detection signal, an image processing unit triggered by the detection signal outputted from the sensor to prowess images produced by the video camera and detect defective objects (products), and a discharge signal generating unit for generating a signal for discharging a defective object at a predetermined position.

In this case, the image processing is performed using only hardware such as logic circuits, and all the hardware in the image processing apparatus can be synchronized at a predetermined video rate, such as 1/60 seconds. Images of the objects are processed for a fixed interval after the images are produced, and the processing is completed in the same order in which the objects arrive at the sensor.

As a result, t he position of the objects at the time when image processing is completed is always fixed. Therefore, the number of pulses corresponding to the distance between this fixed position and the position where defective objects are discharged is also fixed for each of the objects. In the case where an object is determined to be defective, the image processing unit generates a reject signal. This reject signal is shifted by the number of pulses corresponding to the above-mentioned distance to thus generate a discharge signal. Then, a rejecting apparatus is actuated for thereby discharging the defective object at a predetermined position.

As CPU processing speed increases and memory capacities increase in recent years, it has become possible to process images in the automatic inspecting apparatus using software. Although software can perform complex image processing that cannot be performed in hardware alone, the processing time varies according to the condition of the image. As a result, the order in which image processing is completed for objects differs from the order in which the objects arrive at the sensor. Hence, the positions of the objects at the time when image processing is completed are not fixed. Accordingly, a new apparatus is required for discharging defective objects at the fixed discharge position.

SUMMARY OF THE INVENTION

In view of the foregoing, it is therefore an object of the present invention to provide an automatic inspecting apparatus which can image moving objects, process the images to determine whether the objects are defective, and discharge the defective object at a predetermined position even when the processing time differs for each image.

In order to achieve the above object, according to the present invention, there is provided an automatic inspecting apparatus by image processing, comprising: an imaging device for imaging the object which is moved by a moving device having an encoder; a sensor for detecting the arrival of the object and outputting a detection signal; an image processing unit that is triggered by the signal outputted from the sensor to process images produced by the imaging device to detect defective objects; and a discharge signal generating unit for discharging defective objects at a predetermined position; wherein an ID number is assigned to each image produced by the imaging device, pulses generated by the encoder starts to be counted when each ID number is assigned, and if an object is determined to be defective after image processing by the image processing unit, the discharge signal generating unit generates a discharge signal when the number of pulses counted for the corresponding ID number reaches a pulse number equivalent to the distance between the sensor position and the discharge position.

According to the present invention, objects are assigned an ID number, and the number of pulses corresponding to the distance between the sensor position and the discharge position are counted. If an object is determined to be defective by the image processing unit, when the number of pulses counted reaches the number of pulses corresponding to the distance between the sensor position and the discharge position, a discharge signal is generated and the defective object is discharged from a transportation line such as a conveyor.

DETAILED DESCRIPTION OF THE PREFERRED EMBODIMENTS

An automatic inspecting apparatus according to an embodiment of the present invention will be described below with reference to FIGS. 1 and 2.

Figure 1:
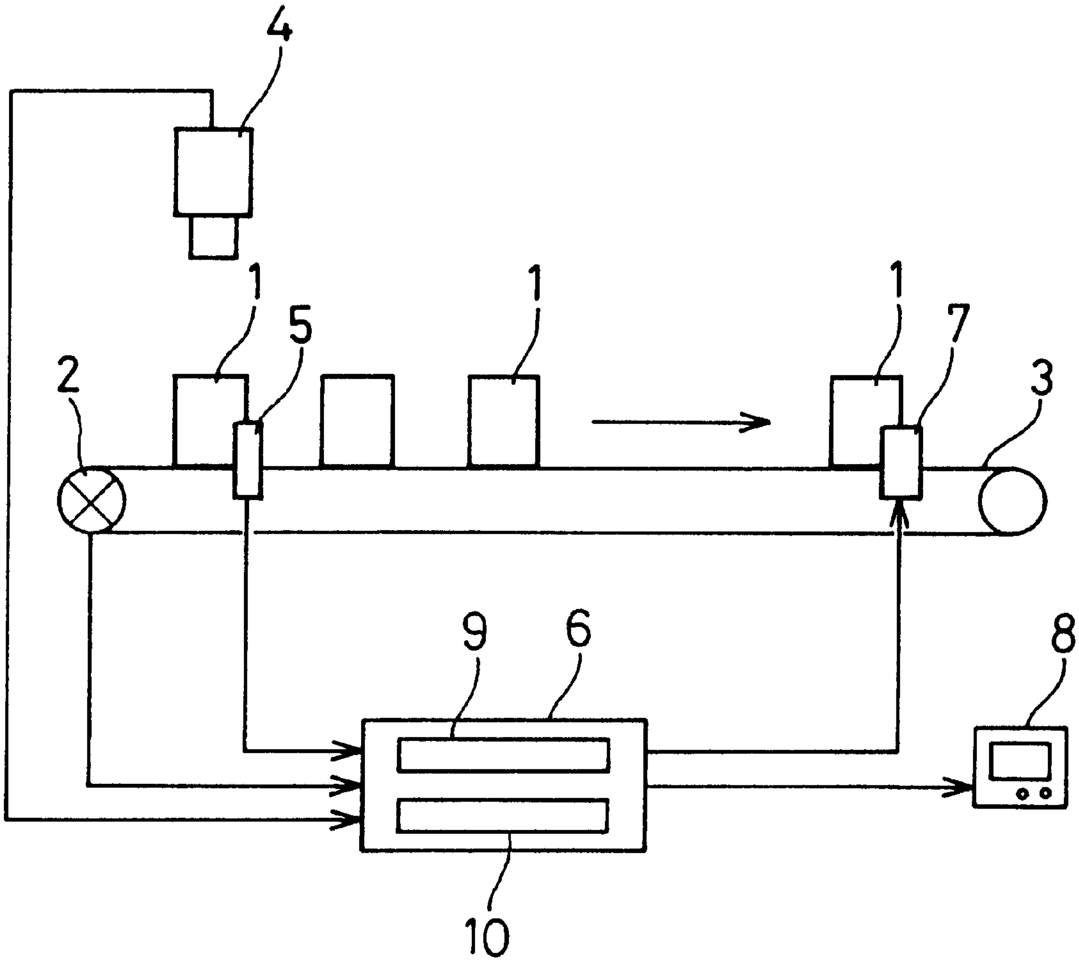
FIG. 1 is a schematic view showing a whole structure of an automatic inspecting apparatus by image processing according to an embodiment of the present invention.

As shown in FIG. 1, the automatic inspecting apparatus comprises a conveyor 3 for conveying objects 1 such as a container, a video camera 4 disposed above the conveyor 3 for imaging each of the objects 1, and a sensor 5 for detecting the object 1 which has reached the position directly beneath the video camera 4. The conveyor 3 is also provided with an encoder 2 that generates pulses for measuring linear displacement of the conveyor 3. The automatic inspecting apparatus is also provided with a controller 6 for processing signals inputted from the encoder 2, the video camera 4 and the sensor 5, a rejecting apparatus 7 disposed at a predetermined position near the outlet end of the conveyor 3, and a monitor 8 for monitoring images produced by the video camera 4.

The controller 6 includes an image processor 9 for processing images produced by the video camera 4 and incorporating signals inputted from the sensor 5 as a trigger to determine whether the objects 1 are defective and a discharger signal generator 10 for generating a discharge signal used for discharging the object 1 at a predetermined position when the object 1 is determined to be defective by the image processor 9.

Figure 2:
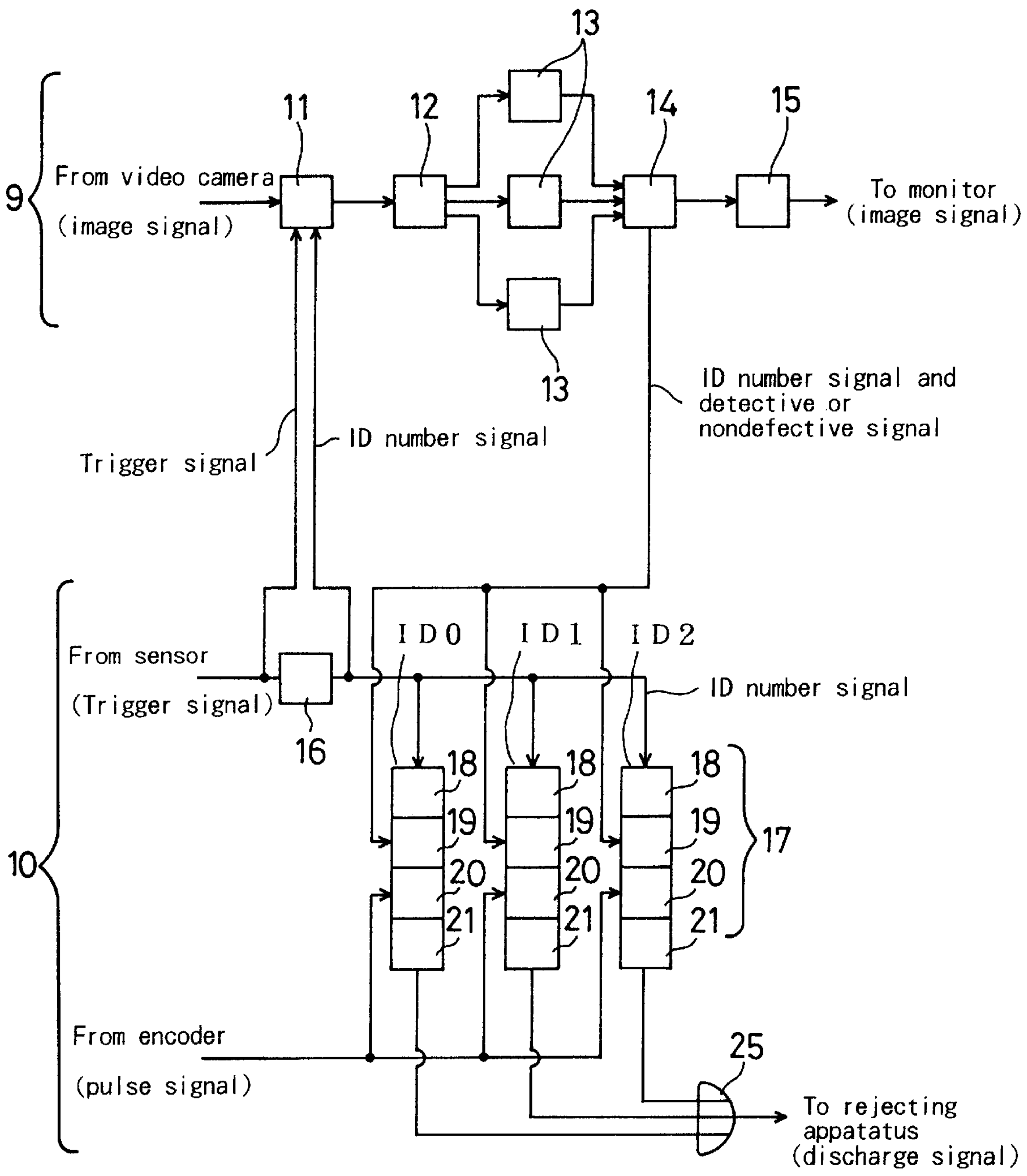
FIG. 2 is a block diagram of the controller shown in FIG. 1 which has an image processor and a discharge signal generator.

As shown in FIG. 2, the image processor 9 comprises an A/D conversion module 11, an image division module 12, a plurality (three in this example) of processing modules 13 arranged in parallel, an image combining module 14, and a D/A conversion module 15. The A/D conversion module 11 receives images from the video camera 4, assigns an ID number to each image, and transmits the image data to the image division module 12. The image division module 12 queues the received images in order, and transmits each image to one of the processing modules 13.

The processing modules 13 process each of the images, determine whether the objects 1 are defective or not based on the images, add data indicating the result of this determination to the images, and transmit the resulting image data to the image combining module 14. The number of required processing modules 13 is determined by the processing time. For complex processing, the number of processing modules 13 increases. The image combining module 14 receives the images from the processing modules 13 in order, and transmits the images to the D/A conversion module 15. At the same time, the image combining module 14 transmits an ID number for each image and data indicating whether the object 1 corresponding to the ID number is defective or not to a, discharge signal generating unit 17 (described later).

The discharge signal generator 10 provided in the controller 6 includes an ID number generator 16 for receiving a trigger signal from the sensor 5 and generating an ID number for each object, and a plurality (three in this example) of discharge signal generating units 17 for generating a discharge signal and outputting the discharge signal to the rejecting apparatus 7. Each of the discharge signal generating units 17 comprises a first comparator 18, a register 19, a counter 20, and a second comparator 21. The number of discharge signal generating units 17 provided in the discharge signal generator 10 is equal to or greater than the number of images that can exist at one time in the image processor 9. The number of discharge signal generating units 17 is determined by the distance between the position of the sensor 5 and the position of the rejecting apparatus 7. The longer this distance, the greater the number of discharge signal generating units 17.

Each ID number is stored in one of the first comparators 18. When the ID number generated by the ID number generator 16 matches the ID number set in the first comparator 18, the first comparator 18 generates a signal for activating the counter 20. The register 19 holds the activating signal and transmits the activating signal to the counter 20. The counter 20 counts pulses generated by the encoder 2 after receiving the activating signal. The second comparator 21 stores the pulse number corresponding to the linear distance in which the object 1 moves from the sensor position to the discharge position.

Based on the result of the image processing performed in the processing module 13, the image combining module 14 transmits an ID number for the image, and a signal corresponding to the ID number and indicating whether the object is defective or not to the discharge signal generating units 17. If the signal indicates that the object is not defective, the counter activating signal held by the register 19 corresponding to the ID number is cleared. Further, the counter 20 is stopped and its counter value is cleared. If the signal indicates that the object is defective, the counter 20 corresponding to the ID number is allowed to continue counting. When the counter value in the counter 20 reaches the pulse number stored in the second comparator 21, the second comparator 21 generates a discharge signal. After the discharge signal is outputted by the second comparator 21, the counter 20 is stopped and its counter value is cleared.

Next, the operations of the automatic inspecting apparatus having the above structure will be described below.

When the object 1 reaches the position of the sensor 5, the sensor 5 detects the object 1 and outputs a trigger signal to the ID number generator 16 in the discharge signal generator 10. For each signal received from the sensor 5, the ID number generator 16 generates an ID number in a cycle, such as 0, 1, 2; 0, 1, 2, . . . . The cycle of ID numbers depends on the number of discharge signal generating units 17. If there are N number of discharge signal generating units 17, for example, then the ID number generator 16 will generate ID numbers in the cycle 0, 1, 2, . . . , N–1; 0, 1, 2, . . . , N–1. Each ID number generated by the ID number generator 16 is inputted into the first comparator 18 of one of the discharge signal generating units 17.

The trigger signal outputted from the sensor 5 and the ID number generated by the ID number generator 16 are inputted into the A/D conversion module 11 of the image processor 9. Upon receiving the trigger signal, the A/D conversion module 11 receives the image from the video camera 4, adds an ID number to this image, and then transmits the resulting image to the image division module 12.

The image division module 12 transmits each image data in order to one of the processing modules 13. The processing module 13 processes the image data, determines whether the object is defective or not based on the image data, adds data indicating whether the object is defective or not to the image, and transmits the resulting image data to the image combining module 14. The image combining module 14 receives image data from the processing module 13 in order and transmits the image data to the D/A conversion module 15. In addition, the image combining module 14 transmits the ID number corresponding to that image and a signal indicating whether the object corresponding to the ID number is defective or not to the discharge signal generator 10.

On the other hand, in the discharge signal generator 10, the ID number signal generated in the ID number generator 16 is inputted into the first comparator 18 of the discharge signal generating unit 17, and this ID number is compared to the ID number set in the first comparator 18. In this example, the first comparator 18 in the discharge signal generating unit 17 on the left in FIG. 2 has been set to the ID number 0, the first comparator 18 in the middle discharge signal generating unit 17 has been set to the ID number one, and the first comparator 18 in the discharge signal generating unit 17 on the right has been set to the ID number 2. The,first comparator 18 storing an ID number that matches the ID number generated in the ID number generator 16 generates a signal for activating the counter 20 in the corresponding discharge signal generating unit 17. The register 19 holds this activation signal and transmits the signal to the counter 20. After receiving the activation signal, the counter 20 begins counting pulses generated by the encoder 2.

As described above, the image combining module 14 outputs the ID number for an image and a signal representing whether the object corresponding to the ID number is defective or not based on the results from the processing module 13. These signals are inputted into each of the discharge signal generating units 17 of the discharge signal generator 10.

If the signal transmitted to each of the discharge signal generating units 17 indicates that the corresponding object is not defective, the counter activation signal stored in the register 19 of the corresponding ID number is cleared. Further, the counter 20 is stopped and the counter value in the counter 20 is cleared. However, if the signal transmitted to each of the discharge signal generating units 17 indicates that the corresponding object is defective, the counter 20 corresponding to the ID number is allowed to continue counting. When the counter value of the counter 20 reaches the pulse number stored in the second comparator 21, the second comparator 21 generates a discharge signal and, outputs this signal to the rejecting apparatus 7 via an output unit 25. After the second comparator 21 outputs the discharge signal, the counter 20 is stopped and the counter value of the counter 20 is cleared. Upon receiving the discharge signal, the rejecting apparatus 7 discharges the object 1 positioned in front of the rejecting apparatus 7 from the conveyor 3.

As described above, objects are assigned an ID number when detected by the sensor, and pulses generated by the encoder start to be counted at this time. If an object is determined to be defective by the image processing unit, the pulses are counted by a prescribed number equivalent to the distance in which the object moves from the sensor position to the discharge position. Since the processing time is not a factor in this operation, it is possible to discharge defective objects (products) at a predetermined position even if the processing time varies for each image. Further, since time is not a factor in this operation, variations in conveying speed will have no effect on the discharging operation.

Although certain preferred embodiments of the present invention have been shown and described in detail, it should be understood that various changes and modifications may be made therein without departing from the scope of the appended claims.

What is claimed is:

1. An automatic inspecting apparatus by image processing, comprising:

a moving device having an encoder for moving an object;

an imaging device for imaging the object which is moved by said moving device;

a sensor for detecting the arrival of the object and outputting a detection signal;

an image processing unit that is triggered by the signal outputted from the sensor to process images produced by said imaging device to detect defective objects;

a discharge signal generating unit for generating a discharge signal to discharge a defective object; and a rejecting apparatus disposed at a discharge position for receiving said discharge signal and discharging the defective object from said moving device;

wherein an ID number is assigned to each image produced by said imaging device, pulses generated by said encoder start to be counted when each ID number is assigned, and if the object is determined to be defective after image processing by said image processing unit, said discharge signal generating unit generates said discharge signal when the number of pulses counted for the corresponding ID number reaches a pulse number equivalent to the distance between the sensor position and the discharge position to discharge the defective object from said moving device by said rejecting apparatus, and if the object is determined not to be defective after image processing by said image processing unit, said discharge signal generating unit clears the number of pulses counted for the corresponding ID number to continue moving the non-defective object by said moving device.

2. An automatic inspecting apparatus according to claim 1, wherein said moving device comprises a conveyor.

3. An automatic inspecting apparatus according to claim 1, wherein said imaging device comprises a video camera.

* * * * *